United States Patent
Oliver et al.

(10) Patent No.: US 8,484,577 B2
(45) Date of Patent: Jul. 9, 2013

(54) WINDOW GROUPING

(75) Inventors: Nuria M. Oliver, Seattle, WA (US);
Arungunram C. Surendran,
Sammamish, WA (US); Chintan S. Thakkar, Mumbai (IN); Gregory R. Smith, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 353 days.

(21) Appl. No.: 12/713,192

(22) Filed: Feb. 26, 2010

(65) Prior Publication Data

US 2010/0153399 A1    Jun. 17, 2010

Related U.S. Application Data

(62) Division of application No. 11/535,822, filed on Sep. 27, 2006, now Pat. No. 7,676,761.

(30) Foreign Application Priority Data

Jun. 30, 2006    (IN) .......................... 1542/DEL/2006

(51) Int. Cl.
*G06F 3/00* (2006.01)
*G06F 3/14* (2006.01)

(52) U.S. Cl.
USPC ........................... 715/803; 715/783; 715/804

(58) Field of Classification Search
USPC .. 715/764, 765, 781, 783, 803, 804; 707/736, 707/737
See application file for complete search history.

(56) References Cited

U.S. PATENT DOCUMENTS

| | | | |
|---|---|---|---|
| 5,694,561 A * | 12/1997 | Malamud et al. | 715/805 |
| 5,726,688 A | 3/1998 | Siefert et al. | |
| 6,108,714 A * | 8/2000 | Kumagai et al. | 719/310 |
| 6,121,968 A | 9/2000 | Arcuri et al. | |
| 6,144,379 A | 11/2000 | Bertram et al. | |
| 6,148,294 A | 11/2000 | Beyda et al. | |
| 6,195,657 B1 | 2/2001 | Rucker et al. | |
| 6,232,972 B1 | 5/2001 | Arcuri et al. | |
| 6,323,884 B1 | 11/2001 | Bird et al. | |
| 6,418,424 B1 | 7/2002 | Hoffberg et al. | |

(Continued)

FOREIGN PATENT DOCUMENTS

WO    2005054982 A2    6/2005

OTHER PUBLICATIONS

Blair Macintyre, et al; "Support for Multitasking and Background Awareness Using Interactive Peripheral Displays", Copyright ACM 2001.(The corresponding document was previously submitted in connection with U.S. Appl. No. 11/535,822 and is not being resubmitted herewith per 37 CFR 1.98(d).).

(Continued)

*Primary Examiner* — Xiomar L Bautista
(74) *Attorney, Agent, or Firm* — L. Alan Collins; Collins & Collins Intellectual, LLC

(57) ABSTRACT

A framework is provided for obtaining window information. The window information can be applied to different assignment models to assign windows to different groups. A group may correspond to a task being performed by a user. The window information can be semantic or temporal information captured as window events and properties of windows whose events are captured. Temporal information can be information about switches between windows. Semantic information can be window titles. Temporal information, semantic information, or both, can be used to assign windows to groups.

12 Claims, 10 Drawing Sheets

U.S. PATENT DOCUMENTS

| | | | |
|---|---|---|---|
| 6,823,344 | B1 | 11/2004 | Isensee et al. |
| 2003/0040850 | A1 | 2/2003 | Najmi et al. |
| 2003/0063564 | A1* | 4/2003 | Ha et al. .................. 370/230 |
| 2005/0125390 | A1 | 6/2005 | Hurst-Hiller et al. |
| 2005/0160107 | A1 | 7/2005 | Liang |
| 2005/0210024 | A1 | 9/2005 | Hurst-Hiller et al. |

OTHER PUBLICATIONS

Simone Stumpf, et al., "Predicting User Tasks: I know what you're Doing", Oregon State University, Corvallis,(The corresponding document was previously submitted in connection with U.S. Appl. No. 11/535,822 and is not being resubmitted herewith per 37 CFR 1.98(d).).

Greg Smith, et al., "GroupBar: The TaskBar Evolved", Microsoft Research (The corresponding document was previously submitted in connection with U.S. Appl. No. 11/535,822 and is not being resubmitted herewith per 37 CFR 1.98(d).).

Liam Bannon, et al., "Evaluation and Analysis of Users' Activity Organization", University of California, San Diego, Dec. 1983(The corresponding document was previously submitted in connection with U.S. Appl. No. 11/535,822 and is not being resubmitted herewith per 37 CFR 1.98(d).).

Dugald Ralph Hutchings, et al., "Display Space Usage and Window Management Operation Comparisons between Single Monitor and Multiple Monitor Users", Copyright ACM2004(The corresponding document was previously submitted in connection with U.S. Appl. No. 11/535,822 and is not being resubmitted herewith per 37 CFR 1.98(d).).

Kurt D.Fenstermacher, et al.,"Display Space Usage and window Management Operation Comparisons between Single Monitor and Multiple Monitor Users";Copyright 2002 IEEE.(The corresponding document was previously submitted in connection with U.S. Appl. No. 11/535,822 and is not being resubmitted herewith per 37 CFR 1.98(d).).

Elin Ronby Pedersen, et al., "Relating Documents via User Activity:The Missing Link", Microsoft Corporation, Redmond, WA 98052, Oct. 2005.(The corresponding document was previously submitted in connection with U.S. Appl. No. 11/535,822 and is not being resubmitted herewith per 37 CFR 1.98(d).).

F.R.A Hopgood, et al., "Methodology of Window Management";Abingdon, UK, Apr. 1985.(The corresponding document was previously submitted in connection with U.S. Appl. No. 11/535,822 and is not being resubmitted herewith per 37 CFR 1.98(d).).

Atsushi Futakata, "Self-organization of Digital Documents based on Process-oriented Relations", 33rd Hawaii International Conference on System Sciences ;Copyright 2000 IEEE.(The corresponding document was previously submitted in connection with U.S. Appl. No. 11/535,822 and is not being resubmitted herewith per 37 CFR 1.98(d).).

Sara A.Bly, et al., "A comparison of Tiled and Overlapping Windows; Xerox Office Systems Division", Palo Alto, CA 94303; Copyright 1986 ACM(The corresponding document was previously submitted in connection with U.S. Appl. No. 11/535,822 and is not being resubmitted herewith per 37 CFR 1.98(d).).

Coen Bron, et al., "Algorithm 457-Finding All Cliques of an Undirected Graph [H]", Communications of the ACM; Sep. 1973 vol. 16, No. 9(The corresponding document was previously submitted in connection with U.S. Appl. No. 11/535,822 and is not being resubmitted herewith per 37 CFR 1.98(d).).

Akiko Aizawa, "An information-theoretic perspective of tf-idf measures", ACM Sigir 2000; Copyright 2002 Elsevier Science Ltd. (The corresponding document was previously submitted in connection with U.S. Appl. No. 11/535,822 and is not being resubmitted herewith per 37 CFR 1.98(d).).

Hermann Wurnig, "Design of a collaborative Multi User Desktop System for Augmented Reality", Institute of Computer Graphics, Vienna University of Technology, Vienna, Austria(The corresponding document was previously submitted in connection with U.S. Appl. No. 11/535,822 and is not being resubmitted herewith per 37 CFR 1.98(d).).

Blaine A. Bell., et al, "Dynamic Space Management of User Interfaces", Department of computer Science, New York, NY 10027, Copyright 2000 ACM(The corresponding document was previously submitted in connection with U.S. Appl. No. 11/535,822 and is not being resubmitted herewith per 37 CFR 1.98(d).).

Eser Kandogan, et al, "Elastic Windows: Evaluation of Multi-Window Operations;University of Maryland", College Park, MD 20742, Copyright 1997 ACM(The corresponding document was previously submitted in connection with U.S. Appl. No. 11/535,822 and is not being resubmitted herewith per 37 CFR 1.98(d).).

Patrick Baudisch, et al, "Focus Plus Context Screens: Combining Display Technology with Visualization Techniques", Xerox Palo Alto Research Center; Palo Alto, CA 94304;Copyright 2001 ACM. (The corresponding document was previously submitted in connection with U.S. Appl. No. 11/535,822 and is not being resubmitted herewith per 37 CFR 1.98(d).).

Scott Derwester, et al, "Indexing by latent Semantic Analysis", Copyright 1990 by John Wiley & Sons, Inc.(The corresponding document was previously submitted in connection with U.S. Appl. No. 11/535,822 and is not being resubmitted herewith per 37 CFR 1.98(d).).

Thomas Hofmann, "Probabilistic Latent Semantic Indexing", International Computer Science Institute and EECS Dept., CS Division, Berkeley, CA;Copyright 1999 ACM.(The corresponding document was previously submitted in connection with U.S. Appl. No. 11/535,822 and is not being resubmitted herewith per 37 CFR 1.98(d).).

Benjamin B Bederson, et al, "Pad++: A Zooming Graphical Interface for Exploring Alternate Interface Physics" ; Nov. 2-4, 1994; Copyright 1994 ACM.(The corresponding document was previously submitted in connection with U.S. Appl. No. 11/535,822 and is not being resubmitted herewith per 37 CFR 1.98(d).).

Daustin Henderson, Jr., et al, "Rooms : The use of Multiple Virtual Workspaces to Reduce Space Contention in a window-based Graphical User Interface", Xerox Palo Alto Research Center;Copyright 1987 ACM.(The corresponding document was previously submitted in connection with U.S. Appl. No. 11/535,822 and is not being resubmitted herewith per 37 CFR 1.98(d).).

George Robertson, et al, "The Task Gallery: A 3D Window Manager", Microsoft Corporation, Redmond, WA 98052; Copyright 2004 ACM. (The corresponding document was previously submitted in connection with U.S. Appl. No. 11/535,822 and is not being resubmitted herewith per 37 CFR 1.98(d).).

George Robertson, et al, "Scalable Fabric:Flexible Task management", Microsoft Corporation, Redmond, WA 98052; Copyright 2004 ACM (The corresponding document was previously submitted in connection with U.S. Appl. No. 11/535,822 and is not being resubmitted herewith per 37 CFR 1.98(d).).

Victoria Bellotti, et al, Taking Email to Task; The design and Evaluation of a Task Management Centered Email Tool; Palo Alto Research Centre, Palo Alto, CA 94304; Copyright 2003 ACM.(The corresponding document was previously submitted in connection with U.S. Appl. No. 11/535,822 and is not being resubmitted herewith per 37 CFR 1.98(d).).

Jun Rekimoto., "Time- Machine Computing; A Time-centric Approach for the information Environment", Sony Computer Science Laboratories, Inc., Tokyo, Japan, Japan, Copyright 1999 ACM. (The corresponding document was previously submitted in connection with U.S. Appl. No. 11/535,822 and is not being resubmitted herewith per 37 CFR 1.98(d).).

M.Porter; "An Algorithm for Suffix Stripping", pp. 130-137;Program vol. 14, Issue 3;1980(The corresponding document was previously submitted in connection with U.S. Appl. No. 11/535,822 and is not being resubmitted herewith per 37 CFR 1.98(d).).

A.P. Dampster, et al., Maximum Likelihood from incomplete Data via De Em Algorithm, pp. 1-38; Journal of the Royal Statistical Society vol. 39;1977(The corresponding document was previously submitted in connection with U.S. Appl. No. 11/535,822 and is not being resubmitted herewith per 37 CFR 1.98(d).).

Muller M.J., et al., "One-Hundred Days in an activity-Centric Collaboration Environment based on Shared Objects," CHI 2004, Apr. 24-29, Vienna, Austria, vol. 6, No. 1(The corresponding document was previously submitted in connection with U.S. Appl. No. 11/535,822 and is not being resubmitted herewith per 37 CFR 1.98(d).).

Dumais, S., et al., "Stuff I've Seen: A System for Personal Information Retrieval and Re-Use," SIG IR'03, Jul. 28-Aug. 1, 2003, Toronto, Canada(The corresponding document was previously submitted in connection with U.S. Appl. No. 11/535,822 and is not being resubmitted herewith per 37 CFR 1.98(d).).

Dragunov, A.N., et al., "TaskTracer: A Desktop Environment to support Multi-tasking Knowledge Workers," IUI'05, Jan. 9-12, 2005, San Diego, California, USA(The corresponding document was previously submitted in connection with U.S. Appl. No. 11/535,822 and is not being resubmitted herewith per 37 CFR 1.98(d).).

Aranya, A., et al.,"Tracefs: A File System to Trace them All", Proceedings of the Third USENIX Conference on File and Storage technologies (FAST 2004)(The corresponding document was previously submitted in connection with U.S. Appl. No. 11/535,822 and is not being resubmitted herewith per 37 CFR 1.98(d).).

Bayardo, R J., et al., "InfoSleuth Agent-Based Semantic: Integration of information in open and Dynamic Environments.", Proceedings of the ACM SIGMOD International Conference on Management of Data, 1997, pp. 195-206(The corresponding document was previously submitted in connection with U.S. Appl. No. 11/535,822 and is not being resubmitted herewith per 37 CFR 1.98(d).).

Jun Rekimoto; Time-Machine Computing: A Time-centric Approach for the information Environment; Sony Computer Science laboratories, Inc., Tokyo, Japan,Copyright 1999 ACM(The corresponding document was previously submitted in connection with U.S. Appl. No. 11/535,822 and is not being resubmitted herewith per 37 CFR 1.98(d).).

M. Porter; An Algorithm for Suffix Stripping; pp. 130-137; Program vol. 14. Issue 3; 1980(The corresponding document was previously submitted in connection with U.S. Appl. No. 11/535,822 and is not being resubmitted herewith per 37 CFR 1.98(d).).

A.P. Dempster; et al; "Maximum likelihood from incomplete Data Via De Em", Algorithm, pp. 1-38; Journal of the Royal Statistical Society vol. 39; 1977(The corresponding document was previously submitted in connection with U.S. Appl. No. 11/535,822 and is not being resubmitted herewith per 37 CFR 1.98(d).).

Nardi. B. A, et al., "Collaborative, Programmable Intelligent Agents," Communications of the ACM, Mar. 1998, vol. 41, No. 3, pp. 96-104(The corresponding document was previously submitted in connection with U.S. Appl. No. 11/535,822 and is not being resubmitted herewith per 37 CFR 1.98(d).).

Russinovich, M et al., "Filemon for Windows," Sysinternals Freeware, http://www.sysinternals.com/utilities/filemon.html(The corresponding document was previously submitted in connection with U.S. Appl. No. 11/535,822 and is not being resubmitted herewith per 37 CFR 1.98(d).).

Adar, E., et al., "Haystack : Per -User Information Environments," In Proceedings of CIKM ' 99 (Kansas City, MO, Nov. 2-6, 1999), ACM Press, 413-422.(The corresponding document was previously submitted in connection with U.S. Appl. No. 11/535,822 and is not being resubmitted herewith per 37 CFR 1.98(d).).

* cited by examiner

260

262:
- MSN Search: Harry Potter Buy Book    -- Microsoft Internet Explorer
- Amazon.com: Harry Potter and the Half-Blood Prince (Book 6): Explore similar items - Microsoft Internet Explorer
- Buy.com - Harry Potter and the Half-Blood Prince (Book 6) : J.K. Rowling : ISBN 0439784549 - Microsoft Internet Explorer
- Harry Potter Book 6 in Miscellaneous Books at BizRate - Compare Prices and Online Stores - Microsoft Internet Explorer
- All Harry Potter Book 6 Products and Stores Online at BizRate - Microsoft Internet Explorer
- Amazon.com: Harry Potter and the Half-Blood Prince (Book 6): Explore similar items - Microsoft Internet Explorer
- http://www.bizrate.com/rd?http://www.google.com/url?sa=l&q=http://service.netmeans.com/bfast/cl - Microsoft Internet Explorer
- http://search.ebay.com/harry-potter-6_W0QQfkrZ1QQfnuZ1QQfromZR8 - Microsoft Internet Explorer
- eBay item 8315147980 (Ends Jun-30-05 19:40:54 PDT) - HARRY POTTER & THE HALF- BLOOD PRINCE BOOK - Microsoft Internet Explorer
- Products - Microsoft Internet Explorer 264:
- Trip to Las Vegas – Message
- Expedia Travel -- discount airfare, flights, hotels, cars, vacation packages, cruises, maps - Microsoft Internet Explorer
- Browser Check - Microsoft Internet Explorer
- Expedia.com is searching for flights on selected travel dates: Sat 7/2/2005 _$(O T_(Bue 7/5/2005 - Microsoft Internet Explorer
- Flights - Microsoft Internet Explorer
- Expedia.com is searching for flights. Please wait. - Microsoft Internet Explorer
- Expedia.com is verifying the price for this trip. - Microsoft Internet Explorer
- Expedia.com Sign In - Microsoft Internet Explorer
- Saved itineraries and favorite destinations - Microsoft Internet Explorer

FIG. 6

WINDOW GROUPING

RELATED APPLICATIONS

This application is a Divisional Application of U.S. application Ser. No. 11/535,822, which was filed with the U.S. Patent and Trademark Office on Sep. 27, 2006 and which claims foreign priority benefit under Title 35, USC Section 119 to Indian Patent Application Number 1542/DEL/2006, filed on Jun. 30, 2006. U.S. application Ser. No. 11/535,822 is hereby incorporated by reference.

BACKGROUND

People using computers often work on multiple tasks and activities, sometimes in parallel or in rapid succession. For example, a user might need to perform one task of making travel arrangements while intermittently performing another task of coding and testing a programming project. To accomplish these unrelated tasks, the user might need to use one set of windows (e.g., web browser window, email client window, spreadsheet window) for the first task and use another set of windows for the second task (e.g., editor window, debugger window, design document window). Switching back and forth between the two tasks can be burdensome; different windows may need to be activated, minimized/maximized, rearranged, etc. In sum, a user may have to frequently manage different sets of system objects (e.g., windows, user interface elements, etc.) that are needed to perform different corresponding tasks.

Efforts have been made to reduce or eliminate this task of managing tasks. Task management systems have been developed to help reduce the effort needed by a user to manage multiple computing tasks. Specifically, task management systems have been developed to facilitate fast switching between tasks, fast resumption of tasks, automatic identification of tasks, and so on. To these ends, various solutions have been considered, such as virtual desktop managers, extensions of the user's desktop with peripheral low-resolution screen space, three dimensional desktop managers, zoomable interfaces, tiled window managers, bumping away irrelevant windows, using a central focus region and a peripheral region for unused windows, enhanced taskbars, and so on. Similar application—specific systems have also been used to help users manage their tasks within a particular application, such as email.

To facilitate task management and in particular task switching, previous task management systems have generally required knowledge of how a user's overall workspace is conceptually partitioned into individual tasks. That is, a basic problem with task management is how to determine which objects (windows, documents, applications, etc.) are associated with each task or working context. This is sometimes referred to as the task assignment problem. Most task management systems rely on explicit user input for such knowledge, despite the extra effort this imposes on a user. There has been little effort toward automatic detection and recognition of a user's tasks, perhaps because of the difficulty of this approach. For example, it can be difficult for a task management system to know whether a newly opened window is part of the current working context, the start of a new working context, or a signal to shift to some other existing working context. There is a need for mechanisms that improve the ability to manage computing tasks.

SUMMARY

The following summary is included only to introduce some concepts discussed in the Detailed Description below. This summary is not comprehensive and is not intended to delineate the scope of protectable subject matter, which is set forth by the claims presented at the end.

A framework is provided for obtaining window information. The window information can be applied to different assignment models to assign windows to different groups. A group may correspond to a task being performed by a user. The window information can be semantic or temporal information captured as window events and properties of windows whose events are captured. Temporal information can be information about switches between windows. Semantic information can be window titles. Temporal information, semantic information, or both, can be used to assign windows to groups.

Many of the attendant features will be more readily appreciated by referring to the following detailed description considered in connection with the accompanying drawings.

DESCRIPTION OF THE DRAWINGS

Like reference numerals are used to designate like parts in the accompanying Drawings.

FIG. 6 shows some example titles.

DETAILED DESCRIPTION

Although embodiments discussed below can benefit task management, the concept of a task per se is not overly significant. A task can be thought of as a human objective, which is difficult to identify. However, the existence of a task can be approximately discerned by identifying objects or windows interrelated in a way that indicates they belong to a common task. That is, it may not be possible to automatically determine the subjective purpose of a task, but it is possible to automatically determine which objects or windows are commonly related to a task by analyzing their properties and/or how they are used over time. The following description relates to automatically grouping objects or windows (assigning objects or windows to groups or "tasks"). The description will cover: a framework for capturing window information and analyzing that information to group windows; techniques to group windows by semantically analyzing window metadata; and techniques to group windows by analyzing temporal use or display of windows.

Capture and Analysis Framework

Figure 1:
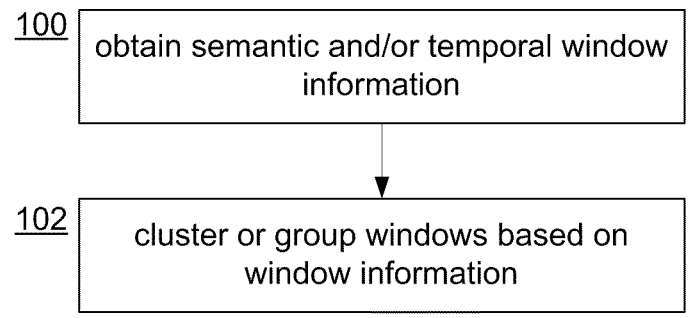
FIG. 1 shows a general process for assigning windows to groups or tasks.

FIG. 1 shows a general process for assigning windows to groups or tasks. First information about objects or windows is obtained 100. This information can include semantic information or metadata about windows, and/or temporal information such as which windows are used and when, which windows are displayed and when, how they are displayed, and so on. Semantic metadata about windows is information about a window object itself rather than information obtained from the content of a window. For example, if a window is used to display a document, the semantic metadata is not the content of the document itself, but rather can be a name or title of the window (the title displayed in the window's title bar), or a screen hint (text displayed to describe a window when a mouse hovers over the window's icon), a title of a window's icon, the executable that the window belongs to, or similar information. Temporal information about windows can include information such as which windows are displayed on a screen at which times, how much of a window is visible at different times, which window is the active or focus window at different times, or the like. In whatever form, the obtained 100 window information, is used as a basis to cluster or group 102 the relevant windows (i.e., assign the windows to groups or tasks). The windows may be clustered or grouped 102 by applying the obtained window information to different assignment models that may reflect different assumptions about how windows interrelate.

Figure 2:
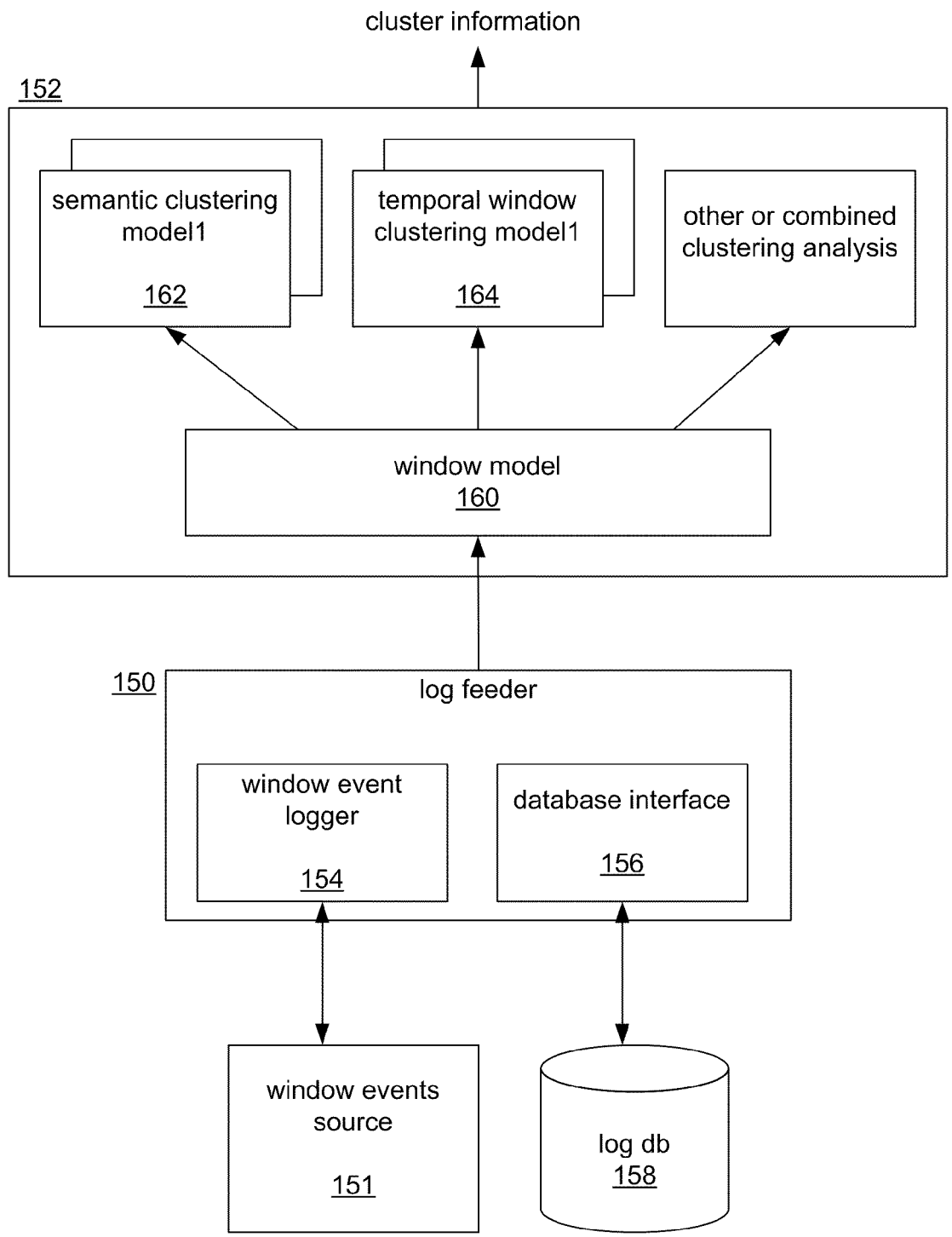
FIG. 2 shows a framework for monitoring and logging user activity and relating windows.

FIG. 2 shows a framework for monitoring and logging user activity and relating windows. The framework may run on any operating system (e.g., Windows, Unix, Linux, Mac OS, Palm, etc.) using any windowing system (e.g. Win32, the X Window System, etc.) to manage the windows that are to be related. The output of the framework is information about clusters of windows, for example, information about which two or more windows have been determined to be related, how strongly windows are related, or possibly delta information indicating changes in which windows belong to which groups or clusters. To get this output, a log feeder 150 module or program acquires and logs a user's activity in the form of window events. A cluster finder 152 program or module uses interprocess window event data supplied by the log feeder 150 to build a window model 160 that represents a state of the windowing system at the time when the corresponding window event data was generated.

The log feeder 150 collects computer activity from an event source 151. Some operating systems expose a collection of events that are keyed to windows by handles or unique identifiers. Events are usually exchanged between applications and the windowing system or window manager. Examples of events include "activated", "deactivated", "closed", "minimized", "gained focus", "lost focus", "opened", "resized", or other similar events. An event is usually represented by a data structure or object which may have any number of properties or fields, including a handle of the window on which the event occurred. To obtain additional information about an event's window, the event's window handle can be used to access the object or data structure (managed by a window system) that represents the event's window.

To capture and log window events, the log feeder 150 has a window event logger 154. The event logger 154 programmatically hooks into the events (e.g., using Windows' SetWinEventHook API) to receive events of interest and collect associated interesting properties of the relevant windows (see FIG. 3). These captured events are surfaced for every window on the system, regardless of the application that owns the window. The event logger 154 may write time-stamped event output sequentially to a log file in a form that can then be imported into database 158 for offline analysis. For this purpose, the log feeder 150 may also have a database interface 156. Further details of the event logger 154 will be described later with reference to FIG. 3. The log feeder 150 outputs a stream of logged event output, either directly from a rolling live event log file or from a previously recorded activity session that has been stored in the database (replaying it in real time as a speed-adjustable "live" interprocess event stream).

Returning to FIG. 2, the cluster finder 152 listens for the interprocess event stream provided by the log feeder 150 and uses the event stream to build and maintain a live window model 160 that represents the window state of the system which generated the event output. The window model 160 has a list or collection of objects that respectively represent the open windows on the system at any given moment (as indicated by the event data) and possibly has interrelationships such as their z-order (i.e., their "depth" within the overlapping window system), parent-child relations, etc. The window model 160 tracks the history of the collection or list and state changes to the windows therein. The window model 160 will at some level be designed to understand the events of a particular windowing system. However, windows events are well understood and interpreting events to reconstruct the state of the windows is straightforward.

In one embodiment, each event may have a particular handler that appropriately changes the state of the window model 160. A "close event" handler might handle "close" events by deleting a window's representation in the model. An "obtain focus" event handler might handle an "obtain focus" event by updating the window model 160 to set a property of the model 160 (and/or a property of a window representation within the model 160) to indicate which window is the current focus window. Yet another event handler might handle events that relate to the display and/or arrangement of windows on a display device (e.g., "minimize" events, "maximize" events, "move" events, "resize" events, and so on). In sum, the window model 160 is able to use window event data (whether "played back" from database 158 or read from a real time log file) to provide an abstracted reconstruction of the window system when the handled events were generated.

It should be noted that window model 160 is not a requirement but rather is a convenient mechanism for abstracting and accessing information about the states of windows over time. A clustering analysis module or some other component could as readily be constructed to interpret the windows events directly into window state information. However, a formal window model 160 allows window states to be flexibly queried. For example, because the window model 160 can reproduce the window system's state at any given time depending on the events that it receives, the model 160 can quickly reproduce a snapshot of the window system at any given time by reading in the events spanning up to that time. In other words, the log feeder 150 can be configured to "playback" events (e.g., from the database 158) over or up to a specified timeframe, and the window model 160 will parse those events and reproduce the window state at the end of that timeframe. In another embodiment, the window model 160 can be constructed to maintain its own history of window state changes, thus allowing it to answer requests about the state of the window system at any requested time. As will be discussed later, this can facilitate different assignment models (models of how windows are assigned to clusters).

The window model 160 supports various clustering models. A clustering model is a model for assigning windows to various groups or categories based on observations of the windows. A clustering model sends to the window model 160 a request for information about the windows, and then uses that information to assign windows to different clusters in accordance with the properties or features of the windows. Each clustering model may have a different algorithm that reflects different assumptions about how observed window events or metadata indicate that windows are interrelated by a common purpose or task or use. Therefore, different clustering models using the same window information might find different clusters of windows. For example, one clustering model might assign windows to groups that have common patterns of long temporal visibility or activity (e.g., several days) and another clustering model might use short term temporal clustering where changing display states of windows are modeled over a shorter period of time (e.g. several hours). A clustering model might also take the output of other clustering models and combine them, using Bayesian analysis or algorithms that give one model greater weight than another.

The general idea of providing a framework for allowing different clustering models to be swapped in or out, or modified can be beneficial regardless of the type of models used to cluster windows. For example, models can be tested and compared using the same window model and same observational data. Different models can be applied to a same set of observational data and the resulting different window clusters can be presented to a user so the user can select the clustering model that produces clusters that the user prefers.

The cluster finder 152 shown in FIG. 2 has several examples of clustering models. A semantic clustering model 162 clusters semantic features (e.g., window titles) of the windows as requested from the window model 160. A temporal clustering model 164 clusters windows based on temporal state changes of windows (e.g., switching focus between windows) obtained from the window model 160. Details of different clustering techniques will be discussed later.

Figure 3:
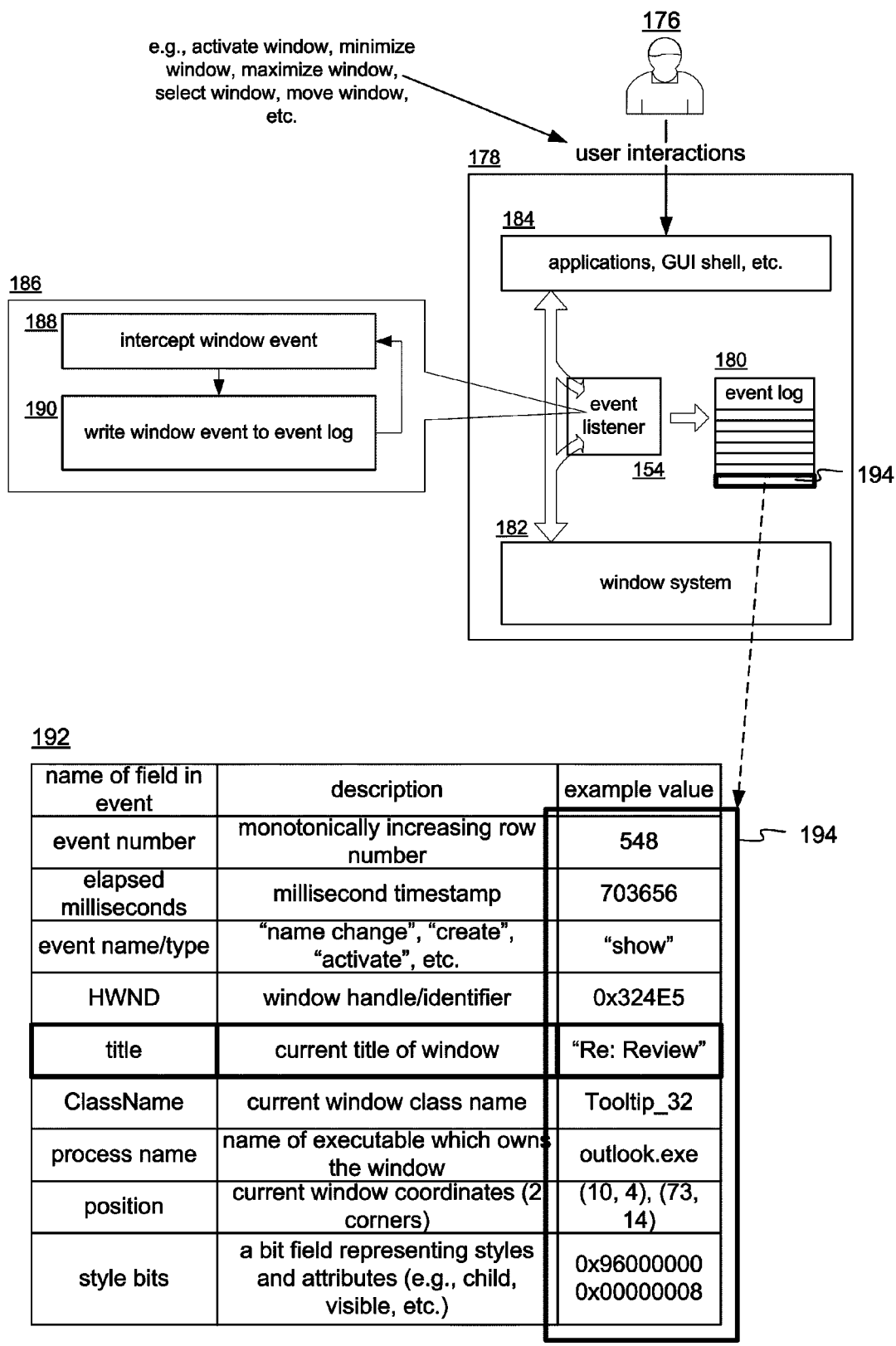
FIG. 3 shows a context within which the window event logger may operate and also shows an example of a window event log.

FIG. 3 shows a context within which the window event logger 154 may operate and also shows an example of a window event log 180. Regarding the context, a user 176 is using a computer 178. In response to user interactions with windows managed by the window system 182, window events are exchanged between the window system 182 (e.g., an X Window server, a Win32 process, a Java runtime environment, etc.) and a set of applications 184 that have instantiated the windows. The window event logger 154 performs a process 186 of listening to or intercepting 188 the window events and logging 190 them to the event log 180. If a Microsoft Windows system is the windowing system 182, then the event logger 154 can use a publicly exposed collection of events. Each event has a window handle that keys the event to the window on which the event occurred. The event logger 154 programmatically hooks this collection of events with the SetWinEventHook API, thus allowing it to receive events of interest and collect associated properties of the relevant windows. These events are surfaced and logged for every window managed by the window system 182, regardless of the application 184 that owns a window. The event logger 154 timestamps the events, which are sequentially written to the log 180 in a form that can then be imported into database 158 for offline or "playback" analysis.

Table 192 shows an abbreviated summary of the structure of the event log 180 and an example log entry 194. As can be seen in table 192, an event entry will usually have information about the time and identity of the event, the type of the event and the identity of the event's window. Information about an event's window that might not be in the intercepted 188 event (e.g., process name) can be obtained from the window system 184 by using the event's window handle. Table 192 describes only one example of an event log. An event log might also track window display information such as position and the z-order of an event's window, which can be used by the window model 160 to determine the display states of the various windows when an event occurred, including how much area of a window was visibly displayed, where a window (or its visible portion) was displayed, and so on. As will be explained later, this type of information can be used by a clustering model to cluster windows based on temporal display features.

Figure 4:
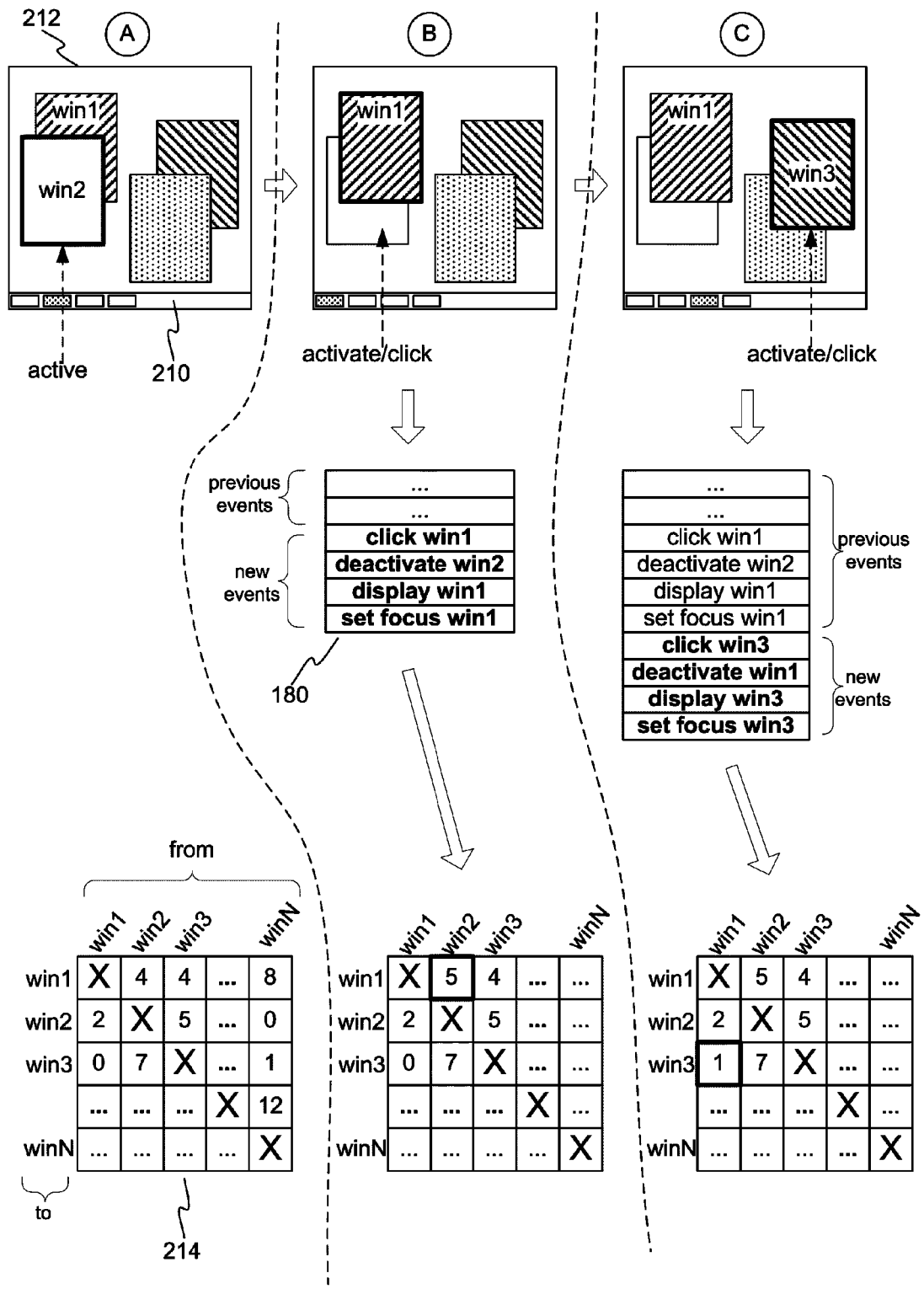
FIG. 4 shows example window events.

FIG. 4 shows example window events. At stage A, the window system is displaying a taskbar 210 and several windows on a display 212. Window2 (win2) is the active window. At stage B a user clicks or activates window1 (win1), which causes an exchange of events between window1's application and the window system. These events are written to event log 180. At stage C the user clicks or activates window 3 (win3) which causes the exchange of another set of window events which are also written to the event log 180. It should be noted that many windowing systems generate events differently, and the exact nature of the events and the order of the particular types of events related to a user action may vary.

As will be discussed in detail later with reference to FIG. 8, the window model 160 can use the events to derive and maintain current temporal information about the windows. For example, the window model 160 can use a matrix 214 to count switches between windows.

Semantic Window Clustering

Windows can be clustered based on semantic information obtained from the windows. Often, a programmer will design an application program to set certain properties of a window, which are maintained by the window system. When an application program sets these window properties, the window properties are available to other applications (such as the event logger 154). As described below, windows can be clustered by semantically analyzing one or more window properties.

Titles, short screen-hint descriptions, or other textual snippets can be tracked and collected from events and windows (e.g., see "title" in table 192 of FIG. 3). This type of information should be distinguished from the content of a document or other user data displayed in the body of a window. Textual window metadata is metadata associated with a window as a system object, usually in the form of a property of a window object or a field of a window data structure. Textual window metadata, for example the window title, is usually programmatically set by the window's application. Textual window metadata may be displayed in association with or as part of its window, regardless of the content or document displayed in the body of the window. For example, a window's title is displayed in the window's title bar, a window's screen-hint is displayed when a pointer is hovered over the window or its icon, a window's icon title is displayed as part of the window's icon, etc. A semantic or text clustering model can perform a general process of obtaining the above-mentioned textual window metadata of respective windows and clustering the windows by semantically analyzing the textual window metadata.

It should be noted that a title, snippet, or small portion of text is a special case of what is sometimes referred to in information retrieval literature as a document. Hereafter, the terms "document", "snippet", and "portion of text" will hereafter be used interchangeably, as appropriate.

Most algorithms for semantically analyzing documents have a convenient representation of the corpus to be processed. Vector space models have a term-cross-document matrix representation of the corpus in which each document is represented as a vector and the document's terms are the dimensions of the vector. In a simple representation, entry ij of the matrix represents how many times the ith term appeared in the jth document. The entry might be further processed to be some function of this value, as discussed below.

Clustering can be based on the assumption that underlying the corpus of documents there is a small set of concepts that the documents are about. Clustering algorithms usually map documents from the high dimensional term space to the low dimensional concept space. In the reduced term space, semantically similar documents should be close to each other while dissimilar documents should to be distant. Following is a description of how to use a statistical generative model—the Probabilistic Latent Semantic Indexing (PLSI) algorithm—to cluster window titles (or other textual metadata of windows). Windows can then be clustered accordingly.

Figure 5:
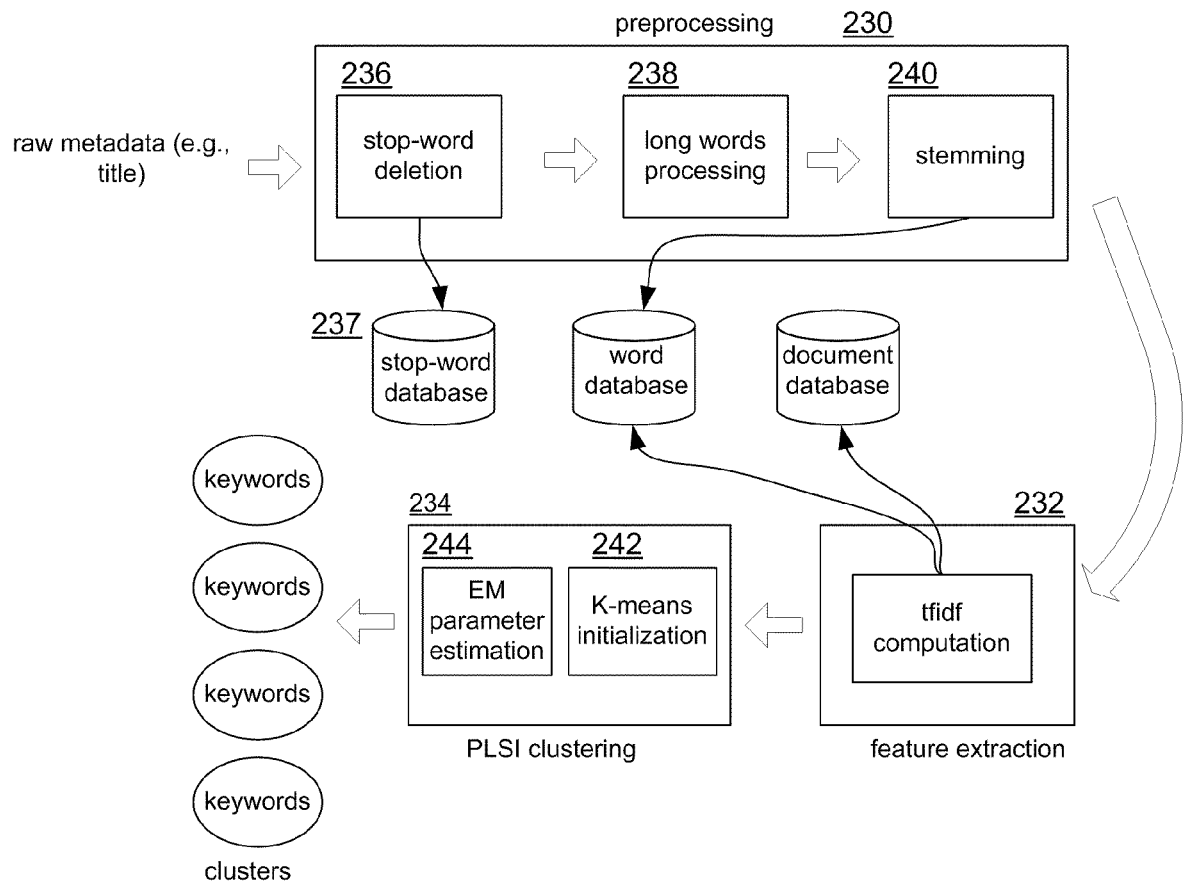
FIG. 5 shows an example of a semantic clustering model.

FIG. 5 shows an example of a semantic clustering model. The example will be discussed as applied to window titles, although the model can be applied to any portions of textual window metadata that are available and associated with respective windows. The model has the basic components: a preprocessing unit 230, a feature extraction unit 232, and a PLSI clustering unit 234. The preprocessing unit 230 receives window titles (and/or other textual window metadata). A stop-word deletion unit 236 deletes stop words listed in a stop-word database 237. Some stop words are words that have little or no relationship to a window's subject matter or content, for example, articles, conjunctions, prepositions, etc. Furthermore, most window titles contain application-dependent words that have no relationship to the content of the window. For example, "Microsoft Internet Explorer" appears in all Internet Explorer windows, regardless of content. During processing, these application-dependent keywords are removed by the stop-word deletion unit 236.

After deleting stop words from the titles, the titles are passed to a long-word processing unit 238. It is not unusual for window titles t6 have arbitrary words that are the result of composing multiple words into one long word. For example, a document could be named "Hawaii_vacation_summer_2005.doc", and this document name might be put verbatim into the window title by the application. Such a long word may be split into smaller, meaningful units, e.g., "hawaii", "vacation", "summer", and "2005". The long-word processing unit 238 passes its output to a stemming unit 240 that derives stem words in the titles. The clean preprocessed versions of the titles are then passed to the feature extraction unit 232.

The feature extraction unit 232 extracts features from the clean titles. The text is represented as raw frequencies of occurrence of terms in titles, which will be referred to as "tf". This representation can cause commonly occurring terms to unnecessarily make all titles look similar even when they are not characteristic of a particular title. To compensate, the feature extraction unit 232 uses an inverse frequency measure ("tfidf") to add weight to the raw frequencies of terms, corresponding to the inverse frequency of pieces of text idf; tfidf=tf*idf. The idf measure for a term i is given by idfi=log |D|/(|Di|+1), where |D| is the total number of titles and |Di| is the number of titles containing term i. The idf measure scales down commonly occurring terms and scales up words which rarely occur in titles and therefore are probably distinctive for any given title. The tfidf measure can be viewed as the mutual information between terms and titles. Suitable results may be obtained by using the tfidf measure.

The results of the tfidf computation are passed from the feature extraction unit 232 to the PLSI clustering unit 234. Probabilistic Latent Semantic Indexing defines a generative model for the document-term pair (di, tj), with i=1, ..., N and j=1, ..., M. The PLSI approach assumes that every document-term pair is independent given a hidden topic z, z=1, ..., K. The probability of (di, tj), P(di, tj) is given by P(di, tj)=P(di) PzZ P(tj |zk)P(zk|di), where P(tj |zk) and P(zk|di) form the model parameters that need to be estimated from data. The parameters can be efficiently estimated using the EM algorithm such that the likelihood of the corpus is maximized. The M-step equations are given by:

$$P(t_j \mid z_k) = \frac{\sum_{i=1}^{N} n(d_i, t_j) P(z_k \mid d_i, t_j)}{\sum_{j=1}^{M} \sum_{i=1}^{N} n(d_i, t_j) P(z_k \mid d_i, t_j)} \quad (1)$$

$$P(z_k \mid d_i) = \frac{\sum_{i=1}^{M} n(d_i, t_j) P(z_k \mid d_i, t_j)}{n(d_i)} \quad (2)$$

where M is the number of terms or words, N the number of documents and Z the number of concepts.

The E-step equation is given by:

$$P(z_k \mid d_i, t_j) = \frac{P(t_j \mid z_k) P(z_k \mid d_i)}{\sum_{k=1}^{K} P(t_j \mid z_k) P(z_k \mid d_i)} \quad (3)$$

To get a clustering from the model parameters, P(zk|di) is examined for all k, and document (title, snippet, etc.) i is assigned to-the cluster that maximizes that probability. Note that it is assumed that the number of hidden topics, Z, is known in advance.

As with most local optimization algorithms, the EM algorithm used to estimate the parameters of the PLSI model is sensitive to its initialization point. In order to help assure that the algorithm starts at a reasonable initial point, the PLSI clustering unit 234 uses a K-means initialization algorithm 242 to obtain the initial values of the parameters. For details on the EM algorithm, see A. P. Dempster, N. M. Laird, and D. B Rubin, Maximum likelihood from incomplete data via de em algorithm, Journal of the Royal Statistical Society, 39-B, pp. 1-38, 1977.

Figure 7:
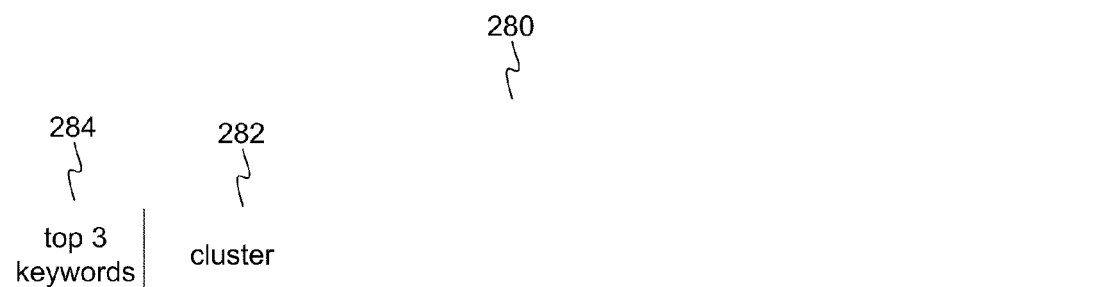
FIG. 7 shows a table of clean title clusters formed according to keywords.

FIG. 6 shows some example titles 260. The titles 260 may be obtained from an assortment of windows. For relating to FIG. 7, the titles 260 are shown as they might be grouped by the clustering model shown in FIG. 5; group 262 corresponds to the top row in FIG. 7, and group 264 corresponds to the bottom row in FIG. 7 (titles corresponding to the middle row of FIG. 7 have been omitted). FIG. 7 shows a table 280 of clean title clusters 282 formed according to keywords 284. Cluster 286 corresponds to title group 262, and cluster 288 corresponds to title group 264.

Although a PLSI based clustering model has been discussed, other clustering models can be used to cluster titles. Suitable clustering techniques can be broadly divided into two categories. Hard clustering techniques such as k-means, agglomerative clustering etc. can be used. Soft clustering techniques can also be used, for example, explanatory models like PLSI, generative models like Latent Dirichlet Allocation, soft K-means, etc. Windows can also be grouped using CEM (classification EM), agglomerative clustering, and others. It should also be noted that clustering based on window titles is open-ended; as will be seen below, window-titles can be used alone or as one of multiple factors or bases used to group or cluster windows.

Temporal Window Clustering

Temporal modeling is another way to cluster windows. A variety of temporal models may be used to cluster windows.

Window switches can indicate relations between windows. Display proximity can also indicate relations between windows. Patterns of co-visibility over time can indicate relations between windows. Other temporal features of windows can be modeled and applied in order to cluster windows.

As mentioned earlier, switching between windows can be modeled. Window switching events that have taken place during a time interval of length T are tracked and used to and automatically build a window switching matrix, WS, where each element wsij is proportional to the number of times that the user switched from window wi to window wj during the time period T. Referring back to FIG. 4, a switching matrix 214 is updated each time there is a switch between users. When the user activates window1 (switches to window1 from window2), element (1,2) of the matrix 214 is increased from 4 to 5, indicating that over some interval T there have been 5 switches from window2 to window1. When the user switches from window1 to window3, element (3,1) is updated from 0 to 1, indicating that there has been one switch from window1 to window3.

Figure 8:
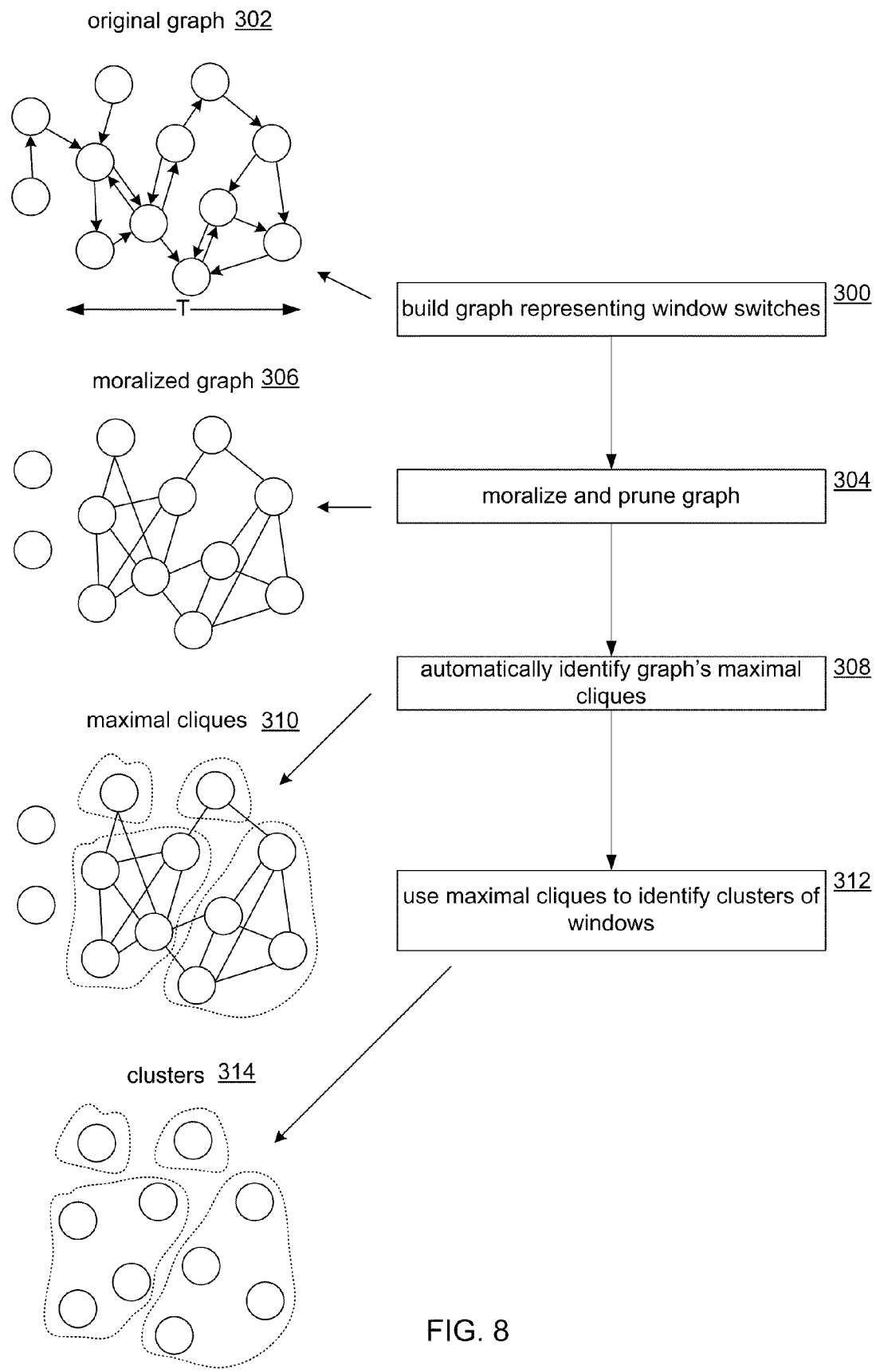
FIG. 8 shows a process for analyzing window switches.

FIG. 8 shows a process for analyzing window switches. The window switching matrix WS (matrix 214 being an example of such) is used to build 300 a directed graph 302 (top, left graph in FIG. 8), where each node represents a window. The edges in the graph 302 correspond to transitions between windows, and weights of the edges are proportional to the number of switches from the window where the edge originates (parent) to the window where it ends (child). This graph 302 is then moralized and pruned 304, which discards the directionality of the switches and eliminates edges with a weight less than a certain threshold, those edges likely corresponding to spurious transitions between unrelated windows. For one technique of moralizing, see C. Bron and J. Kerbosch, Algorithm 457—finding all the cliques of an undirected graph, Communications of the ACM, 16(9), pp. 575-577, 1973. Finally; the moralized graph's 306 maximal cliques are automatically identified 308 via the Bron-Kerbosch algorithm. Each of the cliques (the groups in graph 310) contains the windows that are related to each other by switching, and therefore are assumed to belong to the same task or group. That is, the maximal cliques are used 312 to identify clusters 314 of windows.

Figure 9:
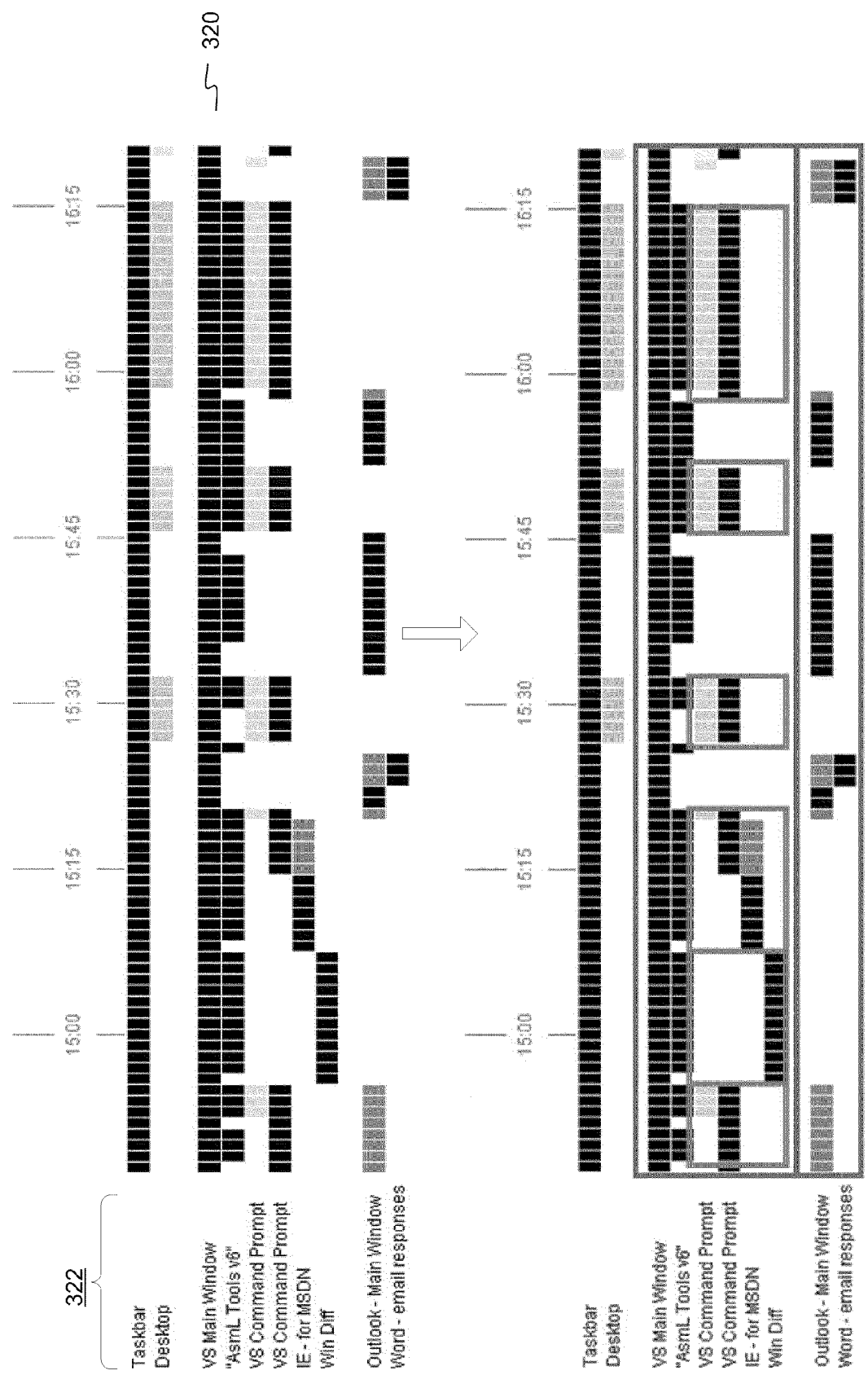
FIGS. 9 and 10 show how window states can be temporally modeled to identify tasks and subtasks.
Figure 10:
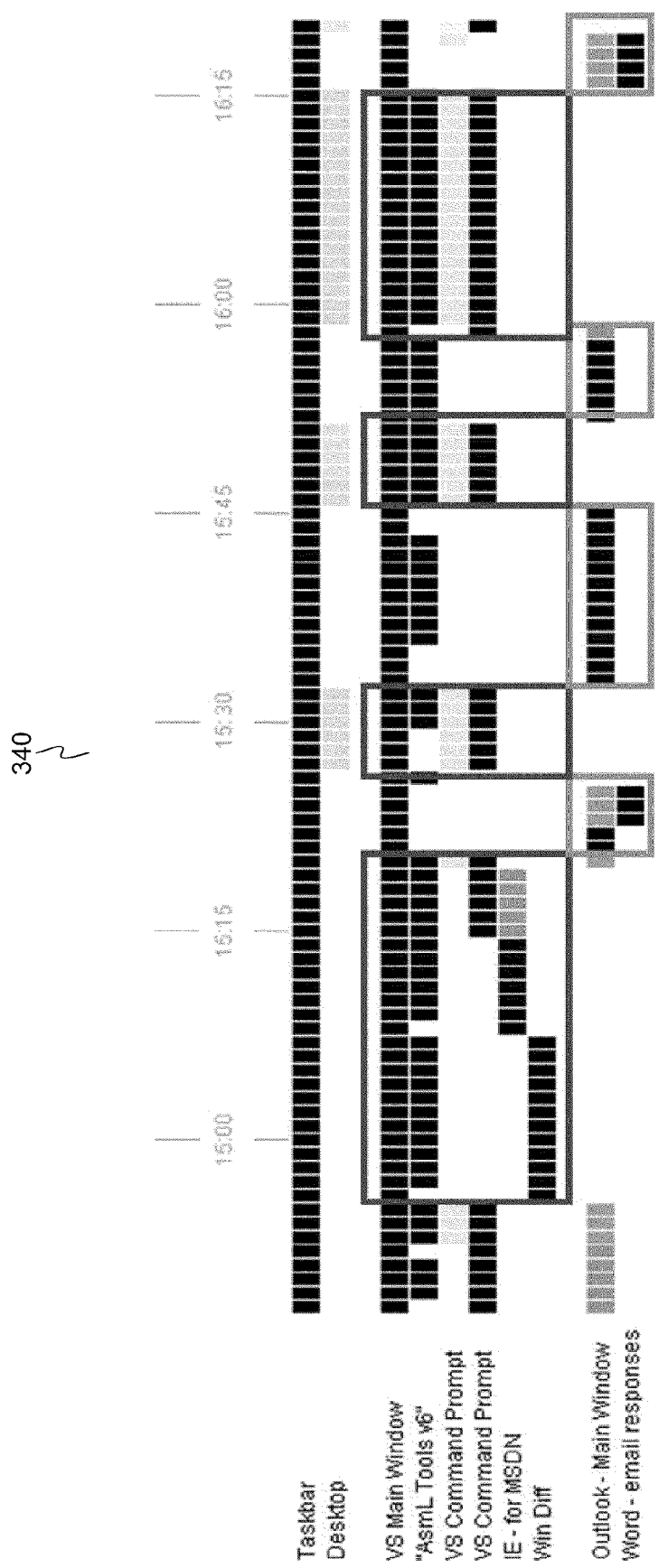

FIG. 9 shows how window states can be temporally modeled to identify tasks and subtasks. In FIG. 9, window display history graphic 320 depicts which windows have been visible at different times (with darkness indicating degree of visibility). This type of information can be provided by the window model 160. A temporal display model groups windows 322 based on which windows were displayed contemporaneously. Repeated co-display may be taken into account, as well as the degree of visibility of two contemporaneously displayed windows. FIG. 10 shows another example 340 of how windows can be clustered based on their display states. In either FIG. 9 or FIG. 10, clustering can be accomplished by modifying weights in the clustering technique discussed above with reference to FIG. 8.

Other Embodiments

As discussed earlier, it is possible to combine the outputs of two or more window clustering models. For example, windows can be clustered based on their titles. Switching or display state history can then be used to cluster a window when the title processing module is not sufficiently confident (i.e., is not above a threshold) about the cluster to which cluster a window's title belongs. This may occur when there is a net title with words unseen by the system, or when the title does not fit well in any of the clusters.

Additional algorithms for ensemble classification may be used. Spectral clustering techniques from the field of information retrieval may be used to cluster window titles. The window switching history can be incorporated directly into the graph that the spectral clustering techniques build. This approach would permit the same representation and mathematical framework to be used for both semantic and temporal analysis.

CONCLUSION

In conclusion, those skilled in the art will realize that storage devices used to store program instructions can be distributed across a network. For example a remote computer may store an example of a process described as software. A local or terminal computer may access the remote computer and download a part or all of the software to run the program. Alternatively the local computer may download pieces of the software as needed, or distributively process by executing some software instructions at the local terminal and some at the remote computer (or computer network). Those skilled in the art will also realize that by utilizing conventional techniques known to those skilled in the art, all or a portion of the software instructions may be carried out by a dedicated circuit, such as a DSP, programmable logic array, or the like.

All of the embodiments and features discussed above can be realized in the form of information stored in volatile or non-volatile computer or device readable medium. This is deemed to include at least media such as CD-ROM, magnetic media, flash ROM, etc., storing machine executable instructions (either prior to execution, during execution, or both), or source code, or any other information that can be used to enable or configure computing devices to perform the various embodiments discussed above. This is also deemed to include at least volatile memory such as RAM storing information such as CPU instructions during execution of a program carrying out an embodiment.

The invention claimed is:

1. One or more computer readable storage media comprising instructions that, when executed by at least one processor, cause the at least one processor to implement a method for grouping windows, the method comprising:
    collecting window events associated with the windows;
    modeling states of the windows based on the collected window events, wherein different states of the windows correspond to different sets of the collected window events;
    assigning various ones of the windows to various different groups based on the modeled states;
    modeling, based on the window events, changing display states of the windows over a period of time, wherein changes in how the windows are displayed comprise switches between windows over time, and wherein the modeled changing display states indicate changes in displayed sizes and/or locations of windows and co-presence on the display; and
    clustering the windows based on the modeled display states.

2. The one or more computer readable storage media according to claim 1, wherein the window events are collected for application programs without requiring the application programs to be modified to facilitate the collecting, and wherein the window events comprise window events passed between the application programs and a window management system that manages windows for arbitrary application programs.

3. The one or more computer readable storage media according to claim 1, wherein the changing display states comprise active window states, and wherein the windows are grouped based on frequencies of the switches between windows.

4. The one or more computer readable storage media according to claim 1, the method further comprising obtaining titles of the windows, and wherein the clustering is based further on the titles of the windows.

5. The method of claim 1, wherein the window events are collected for application programs without requiring the application programs to be modified to facilitate the collecting, and wherein the window events comprise window events passed between the application programs and a window management system that manages windows for arbitrary application programs.

6. A system comprising:
   at least one processor; and
   a memory operatively connected to the at least one processor and comprising stored therein instructions that, when executed by the at least one processor, cause the at least one processor to implement a method for grouping windows, the method comprising:
   collecting window events associated with the windows;
   modeling states of the windows based on the collected window events, wherein different states of the windows correspond to different sets of the collected window events; and
   assigning various ones of the windows to various different groups based on the modeled states;
   modeling, based on the window events, changing display states of the windows over a period of time, wherein changes in how the windows are displayed comprise switches between windows over time, wherein the modeled changing display states indicate changes in displayed sizes and/or locations of windows and co-presence on the display; and
   clustering the windows based on the modeled display states.

7. The system of claim 6, wherein the window events are collected for application programs without requiring the application programs to be modified to facilitate the collecting, and wherein the window events comprise window events passed between the application programs and a window management system that manages windows for arbitrary application programs.

8. The system of claim 6, wherein the changing display states comprise active window states, and wherein the windows are grouped based on frequencies of the switches between windows.

9. The system of claim 6, the method further comprising obtaining titles of the windows, and wherein the clustering is based further on the titles of the windows.

10. A method for grouping windows, the method comprising:
    collecting window events associated with the windows;
    modeling states of the windows based on the collected window events, wherein different states of the windows correspond to different sets of the collected window events;
    assigning various ones of the windows to various different groups based on the modeled states;
    modeling, based on the window events, changing display states of the windows over a period of time, wherein changes in how the windows are displayed comprise switches between windows over time, wherein the modeled changing display states indicate changes in displayed sizes and/or locations of windows and co-presence on the display; and
    clustering the windows based on the modeled display states;
    wherein the modeling and assigning are performed by at least one processor.

11. The method of claim 10, wherein the changing display states comprise active window states, and wherein the windows are grouped based on frequencies of the switches between windows.

12. The method of claim 10, the method further comprising obtaining titles of the windows, and wherein the clustering is based further on the titles of the windows.

* * * * *